COBALT FERRITE MAGNETIC POWDER FOR TAPE RECORDING

Filed Feb. 25, 1969 4 Sheets-Sheet 1

Yoshimi Makino Shigetaka Higuchi INVENTOR.
Iwao Kamiya Yoshikazu Masuya
BY Hill, Sherman, Meroni, Gross & Simpson ATTORNEYS

COBALT FERRITE MAGNETIC POWDER FOR TAPE RECORDING

Filed Feb. 25, 1969 4 Sheets-Sheet 2

Yoshimi Makino Shigetaka Higuchi INVENTOR.
Iwao Kamiya Yoshikazu Masuya
BY Hill, Sherman, Meroni, Gross & Simpson ATTORNEYS Yoshimi Makino Shigetaka Higuchi INVENTOR.
Iwao Kamiya Yoshikazu Masuya
BY Hill, Sherman, Meroni, Gross & Simpson ATTORNEYS

COBALT FERRITE MAGNETIC POWDER FOR TAPE RECORDING

Filed Feb. 25, 1969 4 Sheets-Sheet 4

Yoshimi Makino Shigetaka Higuchi INVENTOR.
Iwao Kamiya Yoshikazu Masuya
BY Hill, Sherman, Meroni, Gross & Simpson ATTORNEYS 3,654,163

COBALT FERRITE MAGNETIC POWDER FOR TAPE RECORDING

Yoshimi Makino and Shigetaka Higuchi, Kanagawa-ken, Iwao Kamiya, Tokyo, and Yoshikazu Masuya, Kanagawa-ken, Japan, assignors to Sony Corporation, Tokyo, Japan Filed Feb. 25, 1969, Ser. No. 802,031
Claims priority, application Japan, Feb. 27, 1968, 43/12,175
Int. Cl. C04b 35/32
U.S. Cl. 252—62.63 1 Claim

ABSTRACT OF THE DISCLOSURE

Improved cobalt ferrite magnetic powders suitable for application to magnetic recording techniques, and containing controlled amounts of zinc, magnesium, cadmium, or calcium, or mixtures of two or more of these metals to improve the storage characteristics of the tape.

BACKGROUND OF THE INVENTION

Field of the invention

This invention is in the field of making magnetic recording powders from cobalt ferrite wherein small amounts of zinc, magnesium, cadmium, or calcium, or mixtures of these metals are added as molecular substituents in the cobalt ferrite.

DESCRIPTION OF THE PRIOR ART

It has heretofore been suggested that cobalt ferrite could be used in the manufacture of magnetic recording tapes, particularly those intended to record video signals. Cobalt ferrite, per se, has a relatively high coercive force and relatively satisfactory electromagnetic conversion characteristics such as frequency response, signal to noise ratio, and the like. However, magnetic tape employing cobalt ferrite magnetic powder exhibits relatively poor storage temperature characteristics. It has been found that tapes containing cobalt ferrite after being stored at ambient temperatures or higher exhibit an undesirable attenuation of the recorded signals as compared with tapes which have not been subjected to such storage.

This disadvantage is not shared by some of the newer magnetic powders such as chromium dioxide, $CrO_2$. Magnetic tape made with such magnetic powders has the advantage over cobalt ferrite magnetic powders in that the former is substantially independent of storage temperature characteristics. Consequently, if the cobalt ferrite system could be modified so that it is no longer dependent upon its history of storage and temperature changes, this material would be effectively competitive with the chromium dioxide.

SUMMARY OF THE INVENTION

The cobalt ferrite systems of the present invention which have improved storage temperature characteristics can be represented by the following formula:

$$(Co_x \cdot M_y) \cdot O_{x+y} \cdot Fe_2O_3$$

where M is zinc, magnesium, cadmium, or calcium, or mixtures of two or more of these metals. For reasons which will become apparent in the more detailed discussion which follows, when M is zinc or magnesium alone, $x$ should be greater than 0.3 but less than 1, and $y$ should be greater than 0.15 but less than 0.3. Where M is cadmium or calcium alone, then $x$ should be greater than 0 but less than 1, and $y$ should be greater than 0.02 but less than 0.15.

Where M is a combination of zinc and magnesium, or zinc and calcium, or zinc-magnesium-cadmium, or zinc-magnesium-calcium, then $x$ should be greater than 0.3 but less than 1, and $y$ should be greater than 0.05 but less than 0.3. where M is the combination of zinc and cadmium, magnesium and cadmium, magnesium and calcium, cadmium and calcium, zinc-cadmium-calcium, or magnesium-cadmium-calcium, $x$ should be greater than 0 but less than 1, and $y$ should be greater than 0.02 but less than 0.15.

DESCRIPTION OF THE PREFERRED EMBODIMENTS

It is generally considered that the storage temperature characteristics of the magnetic powder depend mainly upon the heat demagnetization effect, and the self-demagnetization effect.

The heat demagnetization due to temperature effects can be approximated by the equation:

$$\eta = A_{ote} - \frac{H_c I_r V}{2kT} \qquad (1)$$

$\eta$=heat demagnetization
$A_0$=constant
$t$=time at which the magnetic powder is maintained at temperature T
$H_c$=coercive force in oersteds
$I_r$=residual magnetization in gauss
V=volume of one magnetic grain
$k$=Boltzman's constant
T=temperature in ° K.
$e$=base of natural logarithms The demagnetization due to self-demagnetization effects can be represented by the equation:

$$\rho = f(P,W) \qquad (2)$$

where $\rho$=demagnetization
P=$Ir/Hc$
W=recording frequency
$f$=increasing function which varies with the shape of the B—H curve in the second quadrant.

Figure 1:
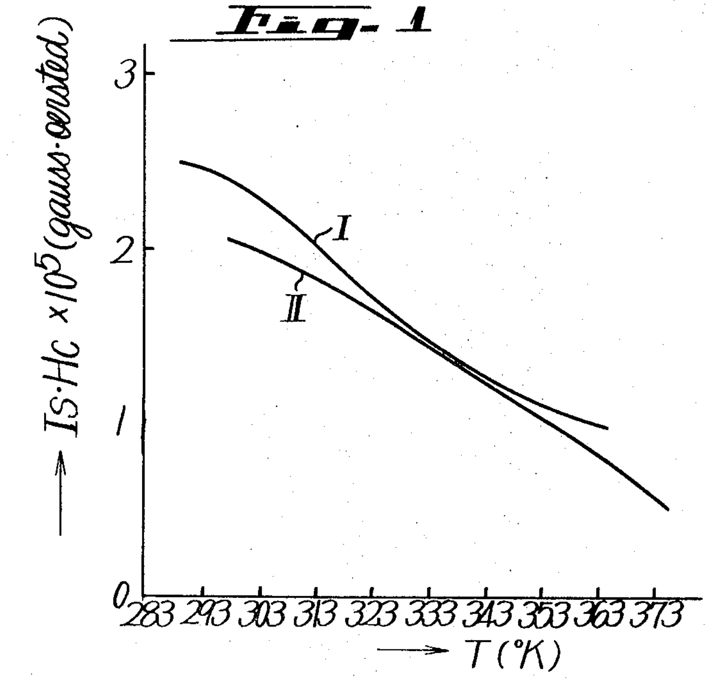
FIG. 1 is a graph illustrating the manner in which $I_s \cdot H_c$ varies with temperature for both a cobalt ferrite and chromium dioxide.

Equation 1 shows that the heat demagnetization effect depends upon the residual magnetization $I_r$, the coercive force, $H_c$, and the temperature. Since $I_r$ varies as the saturation magnetization $I_s$, measurement was made of the produc of saturation magnetization $I_s$ and coercive force, $H_c$ at a temperature of T ° K. with respect to a cobalt ferrite system, and chromium dioxide. The results of these measurements are shown by curves I and II in FIG. 1. From this figure, it will be seen that both curves have similar dependence upon temperature so that both the cobalt ferrite materials and the chromium dioxide should vary in demagnetization in substantially the same way with increases in temperature.

From the fact that a magnetic tape containing chromium dioxide does not exhibit dependence on the storage temperature, and also from Equation 1 it may be presumed that the demagnetization which occurs is not due mainly to heat-demagnetization but rather to self-demagnetization as defined by Equation 2.

The coercive force, $H_c$ of a magnetic grain having a single domain structure is given by the relationship:

$$H \alpha K/I_s \quad (3)$$

where K is termed the magnetic anisotropy constant which represents the anisotropy of magnetic internal energy per unit volume, and $I_s$ is the saturation magnetization.

The magnetic anisotropy constant K depends upon a configurational magnetic anisotropy resulting from the anisotropy of configuration of grains and the crystalline magnetic anisotropy. In the case of chromium dioxide magnetic powder, the magnetic anisotropy constant K depends to a larger extent upon the configurational anisotropy than upon the crystalline anisotropy and is represented by the relationship:

$$K \alpha I_s^2 \quad (4)$$

By substituting the expression (5) into Equation 2 it will be seen that the self-demagnetization effect depends solely upon the recording frequency W.

On the other hand, in the case of cobalt ferrite systems, the magnetic anisotropy constant K depends more completely upon the crystalline magnetic anisotropy than upon the configurational anisotropy, and is represented by the relationship:

$$K \alpha e^{-AT^2} \quad (5)$$

Figure 2:
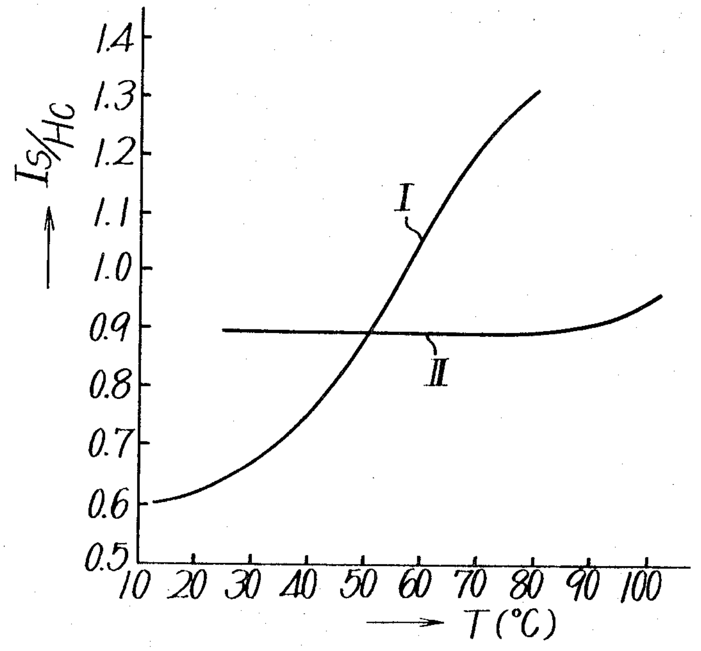
FIG. 2 is a graph illustrating how the factor $I_s/H_c$ varies for both materials with temperature.

As will be seen from expression (3), the coercive force $H_c$ depends upon the variation with temperature of the magnetic anisotropy constant K represented by the expression (5) and the saturation magnetization, $I_s$. The results obtained by measuring the relationship of $I_s$ divided by $H_c$ with respect to temperature in degrees centigrade is shown in FIG. 2, wherein curve I represents the results obtained in the case of a cobalt ferrite system magnetic powder, and curve II represents the results obtained in the use of chromium dioxide powder. From this figure, it will be seen that in the case of the cobalt ferrite system, the ratio $I_s$ divided by $H_c$ varies substantially with the powder, the ratio $I_s$ over $H_c$ remains substantially untemperature T, while in the case of the chromium dioxide changed with temperature.

Figure 3:
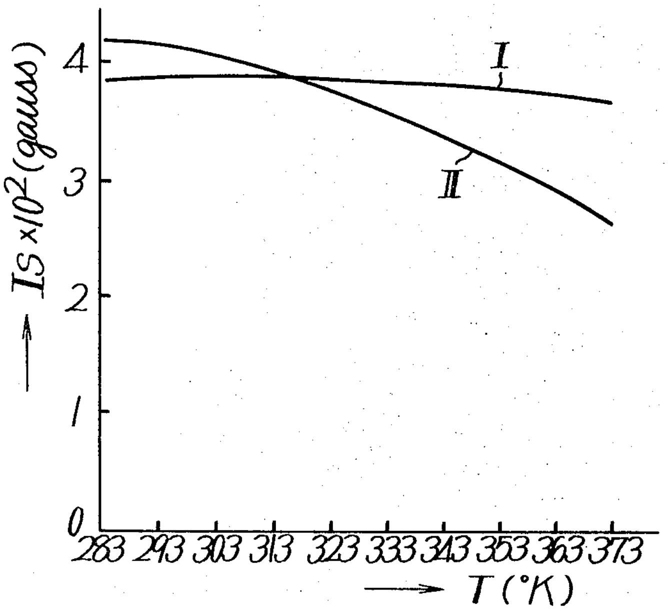
FIG. 3 is a graph illustrating the manner in which $I_s$ varies with temperature for both materials.

The variation in $I_s$ with temperature is shown in FIG. 3. In that figure, curve I shows the results obtained by measuring $I_s$ in terms of temperature for the cobalt ferrite system, and curve II is the same curve for the chromium dioxide system. Curve I shows that the $I_s$ for the cobalt ferrite material remains substantially unchanged within the temperature range for the measurement.

Figure 4:
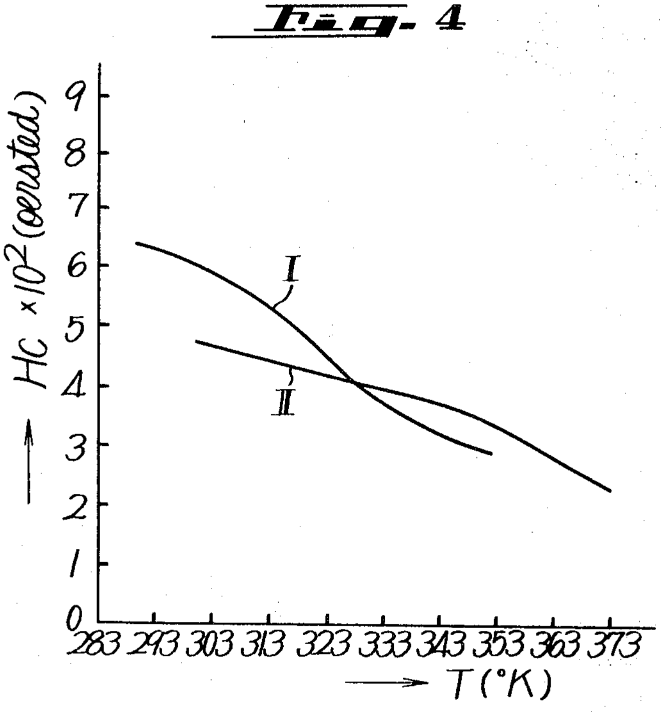
FIG. 4 is a graph illustrating the manner in which $H_c$ varies with temperature for both materials.

FIG. 4 which plots the change in coercive force for the two materials in relation to temperature shows that the coercive force of the cobalt ferrite system (curve I) decreases exponentially with temperature so that the variation of coercive force with temperature corresponds to the variation of K with temperature as represented by expression (5).

The dependence of the saturation magnetization, $I_s$ and the coercive force, $H_c$ of the chromium dioxide powder is shown by curves II in FIGS. 3 and 4, respectively. From these figures it will be seen that the variation in coercive force with temperature is in substantial correspondence between the cobalt ferrite system and the chromium dioxide, but the former differs from the latter with regard to their changes in $I_s$ with temperature. Thus, it may be presumed that it is possible to obtain an improved magnetic powder with lower self-demagnetization effects and freedom from dependence on storage temperature either by minimizing the variation with temperature of the magnetic anisotropy constant K of the cobalt ferrite system to minimize the variation with temperature of the demagnetization relationship expressed in Equation 2 or by modifying the temperature characteristic of the saturation magnetization $I_s$ indicated by curve I of FIG. 3 so that it corresponds to that of chromium dioxide. However, the magnetic anisotropy constant K of the cobalt ferrite system depends largely upon the crystalline anisotropy, as referred to above, and it is very difficult to change the tendency that such crystalline anisotropy changes with temperature. Therefore, the approach is to change the temperature characteristic of the saturation magnetization, $I_s$.

In order to change this temperature characteristic, it is necessary to add to the cobalt ferrite system, an agent which will lower the Curie point of the cobalt ferrite system to increase the $I_s$ at low temperatures. It has been found that the one or more metals zinc, magnesium, cadmium, and calcium can be effectively used for this purpose. The most effective composition containing such additive agents can be represented by the following equation:

$$(Co_x \cdot M_y) \cdot O_{x+y} \cdot Fe_2O_3$$

where M is zinc, magnesium, cadmium or calcium or mixtures of two or more of the metals.

In order to obtain the best results, the following conditions should be observed for choosing the amounts of $x$ and $y$ in the foregoing equation. In the case where M is zinc or magnesium alone, $x$ should be greater than 0.3 but less than 1, and $y$ should be greater than 0.15 but less than 0.3. Where M is cadmium or calcium alone, $x$ should be greater than 0 but less than 1, and $y$ should be greater than 0.02 but less than 0.15.

Where M is a combination of zinc and magnesium, zinc-magnesium-cadmium, or zinc-magnesium-calcium, $x$ should be greater than 0.3 but less than 1, and $y$ should be greater than 0.05 but less than 0.3.

Where M is a combination of zinc and cadmium, zinc and calcium, magnesium and cadmium, magnesium and calcium, cadmium and calcium, zinc-cadmium-calcium, and magnesium-cadmium-calcium, then $x$ is greater than 0 but less than 1, and $y$ is greater than 0.02 but less than 0.15.

Figure 5:
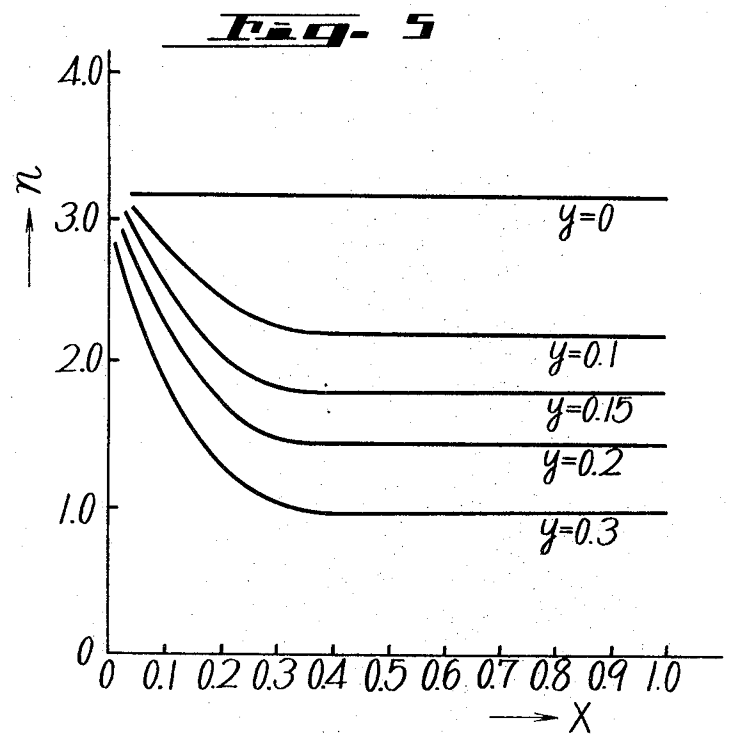
FIGS. 5 through 8 are plots illustrating how the molecular proportion of cobalt oxide influences other parameters.

From FIG. 2, it will be seen that in the case of the cobalt ferrite compositions, the relationship of $I_s$ over $H_c$ to the temperature T can be given by:

$$T^n \alpha I_s/H_c$$

so that $n$ in the above expression can be used as measure in the ratio $I_s$ over $H_c$ with temperature. FIG. 5 shows the results obtained by measuring the relationship between $n$ and $x$ with various values of y wherein M is either zinc or magnesium. From this figure, it will be seen that $n$ decreases with increasing. The decrease of $n$ means that the variation with temperature of $I_s$ over $H_c$ is decreased so that $x$ should be greater than 0.3 but less than 1, and $y$ should be greater than 0.15 for an optimum relationship to exist.

Figure 6:
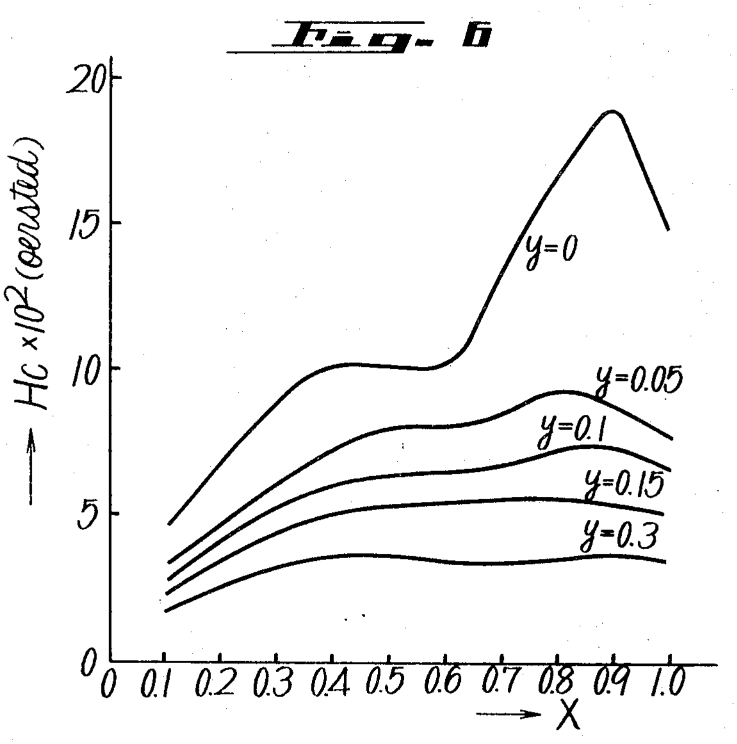

In FIG. 6, there is shown the results obtained by measuring the relationship of coercive force, $H_c$ and $x$ with various values of $y$ where M is zinc or magnesium. From this figure, it will be seen that the coercive force $H_c$ decreases with an increase of $y$. When $y$ is greater than 0.3, the coercive force becomes lower than that of an ordinary magnetic tape containing gamma ferric oxide, so that the coercive force is too low to be practical. Therefore, it is desirable that the range of $x$ with respect to coercive force H be such that $x$ is greater than 0.3 but less than 1, and $y$ should be less than 0.3.

However, where the magnetic powder is to be applied to a tape for video recording applications, the most desirable conditions are those in which $x$ is greater than 0.3 but less than 1, and $y$ is greater than 0.2 but less than 0.25. Under these circumstances, the material will have a coercive force—$H_c$, ranging from about 400 to 100 oersteds.

Figure 7:
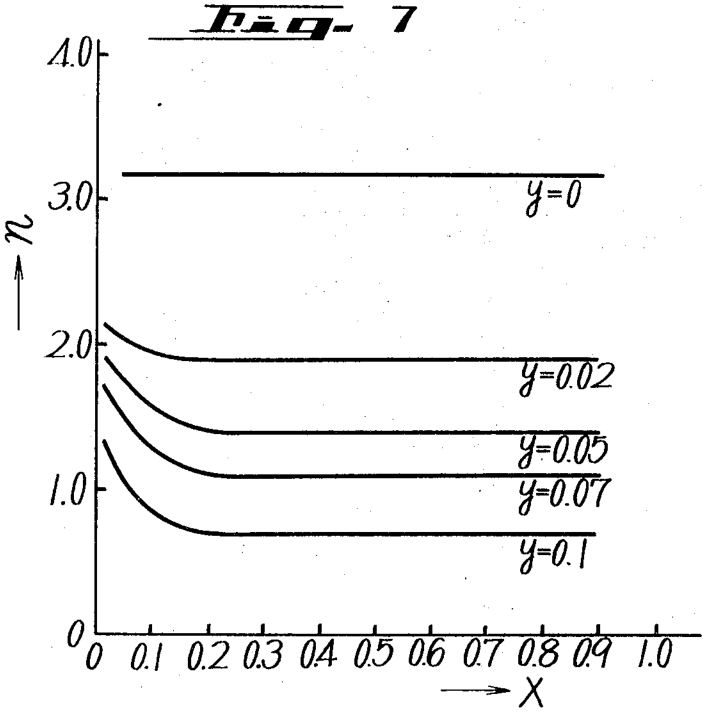

In FIG. 7, there is shown the results obtained by measuring the relationship between $n$ and $x$, with various values of $y$ in the case where M is cadmium or calcium. In this figure, it will be seen that it is desirable that the range of $x$ be greater than 0 but less than 1, and that $y$ be greater than 0.02.

Figure 8:
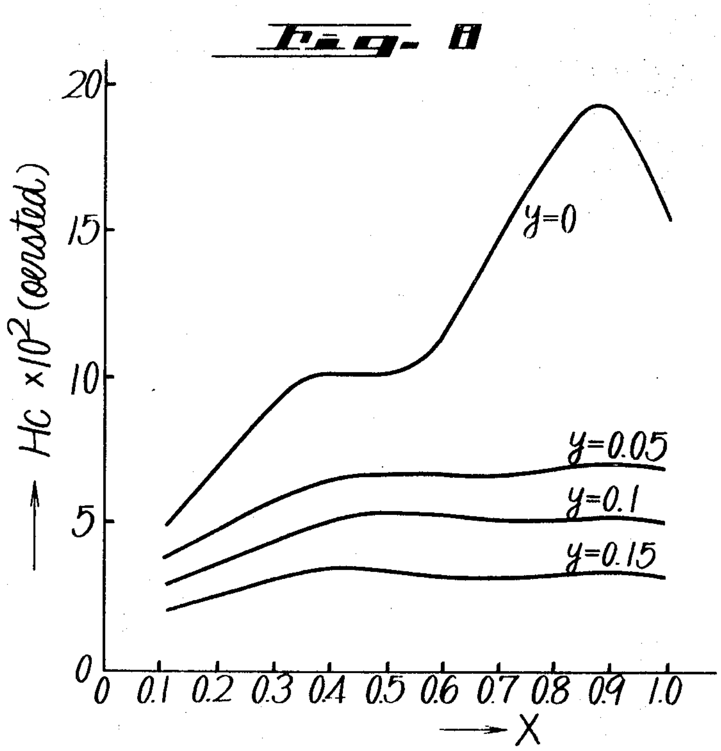

Referring now to FIG. 8, there is shown the results obtained by measuring the relationship between coercive force, $H_c$, and $x$ with various values of $y$ where M is cadmium or calcium. From this figure, it will be seen that $x$ should be greater than 0 but less than 1, and $y$ should be less than 0.15 for best results. In the case of powder that is to be used for recording video signals, the most desirable conditions are those in which $x$ is greater than 0.1 but less than 1, and $y$ is greater than 0.05 but less than 0.13.

For the best overall results, then, we can say that $x$ should be greater than 0.3 but less than 1, and $y$ should be greater than 0.1 but less than 0.25 where the ferrite contains both zinc and magnesium.

By a similar analysis, with respect to materials containing both cadmium and calcium, the most desirable results are obtained when $x$ is greater than 0.05 and less than 1, and $y$ is greater than 0.03 but less than 0.1.

The following specific examples illustrate methods for preparing the magnetic powders of the present invention.

EXAMPLE 1

A first solution was prepared by dissolving 27.8 grams of ferrous sulfate ($FeSO_4 \cdot 7H_2O$) 11.95 grams of cobalt sulfate ($CoSO_4 \cdot 7H_2O$) and 2.88 grams of zinc sulfate ($ZnSO_4 \cdot 7H_2O$) in 200 cc. of water. A second solution was prepared by dissolving 14.4 grams of sodium hydroxide in 100 cc. of water. A third solution was prepared by dissolving 10.11 grams of potassium nitrate in 100 cc. of water.

The second solution was added to the first with agitation so that the mixed hydroxide of iron, cobalt, and zinc was precipitated. Then, the third solution was added to the solution which contained the precipitated hydroxides, with agitation, and then the mixed solution was heated up to the boiling point for two hours. During this time, the water evaporated was replaced as required. The precipitate which resulted was rinsed and filtered. It was dried at a temperature below 100° C. The dried sample was powdered and placed in an electric furnace and heated to a temperature of about 600° C. for two hours. The resulting product was a cobalt ferrite containing zinc as a molecular substituent.

EXAMPLE 2

In this example, the same procedure was followed as in Example 1 except that 2.48 grams of magnesium sulfate ($MgSO_4 \cdot 7H_2O$) was added instead of zinc sulfate. The product obtained was a cobalt ferrite containing magnesium as the substituent.

EXAMPLE 3

A first solution was prepared by dissolving 34.72 grams of ferrous sulfate, and 5.62 grams of cobalt sulfate, and 1.29 grams of cadmium sulfate in 200 cc. of water. A second solution was prepared by dissolving 24.0 grams of sodium hydroxide in 100 cc. of water. A third solution was prepared by dissolving 10.11 grams of potassium nitrate in 100 cc. of water. The second solution was added to the first with agitation so as to precipitate the mixed hydroxide of iron, cobalt, and cadmium. After agitation of the resulting solution, the third solution was added and agitation was continued. The resulting solution was placed in an oven for two hours. Then the resulting precipitate was rinsed and filtered and dried at a temperature below about 100° C. The dried sample was powdered and placed in an electric furnace for heat treatment at a temperature of 400° C. for about two hours. The product which resulted was a cadmium substituted cobalt ferrite.

EXAMPLE 4

A 40% by weight aqueous solution containing 39.8 grams of ferrous chloride ($FeCl_2 \cdot 4H_2O$), 9.52 grams of cobalt chloride ($CoCl_2 \cdot 6H_2O$) and 1.47 grams of calcium chloride ($CaCl_2 \cdot 2H_2O$) was prepared and then a 6% by weight aqueous solution containing 1.5 oxalic acid was added thereto, to form a precipitate. Then, the resulting precipitate was rinsed and dried and it was reduced with hydrogen and subsequently oxidized. The resulting product contained 4/10 mol of cobalt oxide and 1/10 mol of calcium oxide for every mol of ferric oxide.

EXAMPLE 5

Cobalt sulfate and zinc sulfate were added to an aqueous solution of ferric chloride of about 5% concentration to produce a mixed solution of ferric, cobalt, and zinc ions. Then an aqueous solution of about 5% sodium hydroxide concentration was added to the mixed solution to such an extent that the pH of the solution became about 12.5. This resulted in the precipitation of a mixed hydroxide of iron, cobalt and zinc. The remaining solution was heat treated at 130 to 200° C. for about thirty minutes. Then, the precipitate was filtered, dried and powdered, and place in an electric furnace to be subjected to heat treatment at about 400° C. for two hours. The cobalt ferrite which resulted was zinc substituted.

It should be evident that various modifications can be made to the described embodiments without departing from the scope of the present invention.

We claim as our invention:

1. A cobalt ferrite magnetic powder having the formula:

$$(Co_x \cdot M_y) \cdot O_{x+y} \cdot Fe_2O_3$$

where M is selected from the group consisting of cadmium and calcium, $x$ is greater than 0.1 but less than 1, and $y$ is greater than 0.02 but less than 0.15.

References Cited

UNITED STATES PATENTS

| | | | |
|---|---|---|---|
| 2,906,979 | 9/1959 | Bozorth | 252—62.62 |
| 3,420,777 | 1/1969 | Polasek et al. | 252—62.62 |

FOREIGN PATENTS

| | | | |
|---|---|---|---|
| 1,129,275 | 9/1956 | France | 252—62.64 |

ROBERT D. EDMONDS, Primary Examiner

U.S. Cl. X.R.

252—62.62

UNITED STATES PATENT OFFICE

CERTIFICATE OF CORRECTION

Patent No. 3,654,163 Dated April 4, 1972

Inventor(s) Yoshimi Makino et al.

It is certified that error appears in the above-identified patent and that said Letters Patent are hereby corrected as shown below:

Column 4, line 72, "400 to 100" should read

--400 to 600--.

Signed and sealed this 10th day of July 1973.

(SEAL)
Attest:

EDWARD M.FLETCHER,JR.
Attesting Officer

Rene Tegtmeyer
Acting Commissioner of Patents